(12) United States Patent
Morrey

(10) Patent No.: US 8,560,614 B2
(45) Date of Patent: Oct. 15, 2013

(54) SCANNER-DRIVEN EMAIL MESSAGE DECOMPOSITION

(75) Inventor: Richard Morrey, Santa Clara, CA (US)

(73) Assignee: McAfee, Inc., Santa Clara, CA (US)

( * ) Notice: Subject to any disclaimer, the term of this patent is extended or adjusted under 35 U.S.C. 154(b) by 1304 days.

(21) Appl. No.: 11/605,369

(22) Filed: Nov. 29, 2006

(65) Prior Publication Data

US 2008/0126493 A1    May 29, 2008

(51) Int. Cl.
*G06F 15/16* (2006.01)
(52) U.S. Cl.
USPC ........... 709/206; 715/733; 715/759; 707/770; 379/93.01
(58) Field of Classification Search
USPC .......... 726/8, 26, 24, 22, 25, 23, 11; 719/330, 719/328, 318; 717/178, 173, 170; 709/207, 709/206, 224, 201, 246, 230, 227, 223, 204, 709/203, 205; 707/9, 104.1, 102, 100; 706/55
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2003/0088627 A1* | 5/2003 | Rothwell et al. | 709/206 |
| 2004/0199773 A1* | 10/2004 | Radatti et al. | 713/176 |
| 2006/0190481 A1* | 8/2006 | Alspector et al. | 707/103 R |
| 2007/0038705 A1* | 2/2007 | Chickering et al. | 709/206 |
| 2007/0039051 A1* | 2/2007 | Duthie et al. | 726/22 |
| 2007/0061402 A1* | 3/2007 | Mehr et al. | 709/206 |

* cited by examiner

*Primary Examiner* — David Lazaro
*Assistant Examiner* — Charles Murphy
(74) *Attorney, Agent, or Firm* — Patent Capital Group

(57) ABSTRACT

A method, system, and computer program product for scanning emails by reducing the amount of decomposition processing that is performed to only the minimum necessary to fully scan the emails. This reduces the server resources needed, which improves server throughput and reduces costs. A method for processing email messages comprises the steps of receiving an email message comprising a plurality of items, scanning the email message with at least one scanner software, determining with each of the at least one scanner softwares what items of the plurality of items the email message is to be decomposed into, decomposing the email message to obtain the items determined by each of the at least one scanner software.

31 Claims, 20 Drawing Sheets

Fig. 3

```
300 ── Function ScanDecompositionTree (DecompositionNode
         node, ScannerArray scanners)
    Begin 302 ──   # Run all scanners on this subtree
         For each scanner in scanners
             var satisfied = scanner.Scan(node)
             if satisfied then
                 scanners.Remove(scanner)
             End if
         Next 304 ──   # Force any remaining decompositions at this
         level if
             # all scanners have not been satisfied.
         if scanners.length() > 0 then
             node->Decompose(any)
         End if 306 ──   # Scan all children with scanners that haven't
         been satisfied
         For each child in node.children
             ScanDecompositionTree(child, scanners)
         Next
    End
```

Fig. 4

```
400 ─╮
      Function Scanner::Scan(DecompositionNode node)
   Begin

402 ─╮
        #  Check whether node is the correct type
      if node.Type() IN supportedItemTypes then
      {
   404 ─╮
        # Do scan including any further decompositions
      that may be required

...

return satisfied;
      }
      else
            return notSatisfied;
   End
```

Fig. 5

```
500 ─╮
      Function DecompositionNode::Decompose(ItemType itemType)
      Begin
   502 ─────╮
             For each decomposer in decomposers
            var child = decomposer-
      >Decompose(this,itemType);
                if child <> NULL
                        return child
         Next
         return NULL
      End
```

Fig. 6

```
600 ─┐
     Function DecompositionNode::Type()
     Begin
             var type=binary
             var i=1
602 ─┐
     For each decomposer in decomposers
             type = decomposers.CanDecomposeFrom(node)
             if type <> unknown then
                     return type
         Next
         return type
     End
```

Fig. 7

```
700 ─┐
     Function Decomposer::CanDecomposeFrom(DecompositionNode node)
     Begin
702 ─┐
     # Check contents of node to see if it is
     something this decomposer recognises
             ….

return recognised ? supportedFromItemType:
     unknown;
     End
```

Fig. 8

```
800 ─╲
    Function Decomposer::Decompose(DecompositionNode node,
    ItemType itemType)
802 ─── Begin
        # Drop out if this decomposer does not support
    either node or
        if itemType <> supportedToItemType OR NOT
    CanDecomposeFrom(node)
            return null;
        End if 804 ─────
        # Create a new node and decompose to it
        var child = new DecompositionNode
        ...

# Add as new child of given node
        node.children.Add(child)
        return child
    End
```

Fig. 9

| 902 SCANNER | 904 ITEM TYPES SATISFIED BY A SCAN | 906 ITEM TYPES SCANNED |
|---|---|---|
| ANTIVIRUS | DOCUMENT, HTML | MIME, DOCUMENT, HTML |
| ANTISPAM | MIME | MIME HEADERS, HTML, TEXT, LIST OF URLS. |
| BADCONTENT | TEXT | TEXT |

Fig. 10

| 1002 DECOMPOSER | 1004 ITEM TYPE DECOMPOSED FROM | 1004 ITEM TYPES DECOMPOSED TO |
|---|---|---|
| MIME | MIME | MIME HEADERS, HTML, UNKNOWN |
| ZIP | ZIP | UNKNOWN |
| HTML | HTML | TEXT |
| TEXT | TEXT | LIST OF URLS |
| DOCUMENT | DOCUMENT | TEXT |

| 1102<br>UNSATISIFED SCANNERS | 1104<br>ACTION | 1106<br>RESULT |
|---|---|---|
| ANTIVIRUS | RECOGNISE AS MIME AND SCAN. | UNSATISFIED |
| ANTISPAM | RECOGNISE AS MIME AND FORCE DECOMPOSITION. | UNSATISFIED |
| BADCONTENT | NOT RUN | UNSATISFIED |

| 1202 UNSATISFIED SCANNERS | 1204 ACTION | 1206 RESULT |
|---|---|---|
| ANTISPAM | SCANS THE MIME HEADERS. AS THESE ARE NOT ENOUGH TO COMPLETE THE SCAN IT DECOMPOSES TO HTML AND SCANS THAT. | UNSATISFIED |
| ANTIVIRUS | NOT RUN | UNSATISFIED |
| BADCONTENT | NOT RUN | UNSATISFIED |

| 1302 UNSATISFIED SCANNERS | 1304 ACTION | 1306 RESULT |
|---|---|---|
| ANTISPAM | COMPLETES SCAN | SATISFIED BY WHOLE TREE |
| ANTIVIRUS | NOT RUN | UNSATISFIED |
| BAD CONTENT | NOT RUN | UNSATISFIED |

| 1402<br>UNSATISFIED<br>SCANNERS | 1404<br>ACTION | 1406<br>RESULT |
|---|---|---|
| ANTIVIRUS | REPORTS NO INTEREST IN MIME HEADERS AND SCANS HTML | NOT SATISFIED BY MIME HEADERS, SATISFIED BY HTML |
| BAD CONTENT | SCANS MIME HEADERS AND TEXT | SATISFIED BY MIME HEADERS AND TEXT |

| 1502 UNSATISFIED SCANNERS | 1504 ACTION | 1506 RESULT |
|---|---|---|
| ANTIVIRUS | SCANS DOCUMENT | SATISFIED. |
| BAD CONTENT | NOT INTERESTED IN DOCUMENT | UNSATISFIED |

| 1602 UNSATISFIED SCANNERS | 1604 ACTION | 1606 RESULT |
|---|---|---|
| BAD CONTENT | SCANS TEXT | SATISFIED. |

| 1702<br>UNSATISFIED<br>SCANNERS | 1704<br>ACTION | 1706<br>RESULT |
|---|---|---|
| ANTISPAM | SCANS THE MIME HEADERS AND DETERMINES THAT THE MIME IS SPAM. | SATISFIED BY MIME. |
| ANTIVIRUS | NOT RUN | UNSATISFIED |
| BADCONTENT | NOT RUN | UNSATISFIED |

| 1802<br>UNSATISFIED<br>SCANNERS | 1804<br>ACTION | 1806<br>RESULT |
|---|---|---|
| ANTIVIRUS | NOT INTERESTED IN MIME HEADERS | SATISFIED BY MIME HEADERS. |
| BAD CONTENT | SCANS MIME HEADERS | SATISFIED BY MIME HEADERS. |

| 1902 UNSATISFIED SCANNERS | 1904 ACTION | 1906 RESULT |
|---|---|---|
| ANTIVIRUS | SCANS HTML | SATISFIED BY HTML. |
| BAD CONTENT | DOESN'T RECOGNISE HTML. | UNSATISFIED |

| 2002<br>UNSATISFIED<br>SCANNERS | 2004<br>ACTION | 2006<br>RESULT |
|---|---|---|
| BAD CONTENT | SCANS TEXT | SATISFIED BY TEXT |

SCANNER-DRIVEN EMAIL MESSAGE DECOMPOSITION

BACKGROUND OF THE INVENTION

1. Field of the Invention

The present invention relates to scanning emails using a "scanner-driven" model, in which each scanner requests the amount of decomposition it requires to make a decision on the binary stream.

2. Description of the Related Art

The prevalence of unsolicited commercial email, commonly known as spam has grown rapidly and still growing. The corporate world and individual home users are spending millions of dollars to combat spam. Internet Service Providers (ISPs) have to cope with greatly increasing day-to-day amounts of network traffic due to the increase in spam emails. If spam traffic continues to grow, it may become unmanageable in the near future.

Another common and growing problem is the spread of computer malwares. A typical computer malware is a program or piece of code that is loaded onto a computer and/or performs some undesired actions on a computer without the knowledge or consent of the computer operator. The most widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers.

Typically, incoming emails may be scanned for a variety of undesirable contents. For example, emails may be scanned to determine whether or not they are spam, whether or not they include viruses or other malware, or whether or not they include inappropriate or other "bad" content.

Typically, spam has been fought by the use of software that scans incoming email messages to determine whether each message is spam, includes malware, or includes bad content. If so, the messages are accordingly marked as *SPAM* or quarantined. When a data stream is presented for scanning it is often a compound object such as a MIME stream or archive file. This stream is decomposed into its constituent files before being presented to the AntiVirus, AntiSpam, bad conent, and other scanners. Traditionally this process has been "decomposition-driven". That is, the binary stream is decomposed into as many different parts as possible and then each of these parts is been presented to the scanners.

However, a large ISP can receive millions of emails each day, each of which must be scanned. Other large organizations may receive thousand of emails each day. On an average each mail takes from 15 milliseconds to 400 milliseconds to scan for such spam content. Thus consumes a huge amount of email server time and can in turn create a loss in the productivity of the organization.

SUMMARY OF THE INVENTION

A method, system, and computer program product for scanning emails by reducing the amount of decomposition processing that is performed to only the minimum necessary to fully scan the emails. This reduces the server resources needed, which improves server throughput and reduces costs. This provides an alternative "scanner-driven" model, in which each scanner requests the amount of decomposition it requires to make a decision on the binary stream and no more, thus optimizing the amount of decomposition carried out for any one scan. Such a model is particularly relevant to AntiSpam scanning, where a decision can often be made before all possible levels of decomposition have been carried out. In more general terms it is applicable when users have turned off certain scanners, such as "content".

A method for processing email messages comprises the steps of receiving an email message comprising a plurality of items, scanning the email message with at least one scanner software, determining with each of the at least one scanner softwares what items of the plurality of items the email message is to be decomposed into, decomposing the email message to obtain the items determined by each of the at least one scanner software.

The method may further comprise the step of scanning the items obtained by each of the at least one scanner softwares with that scanner software. The determining step may comprise the step of determining what items of the plurality of items the email message is to be decomposed into based on the items of the plurality of items that a scanner software is capable of scanning. The at least one scanner softwares may comprise a plurality of scanner softwares and the decomposing step may comprise the step of decomposing the email message to obtain each item determined by at least one of the plurality of scanner softwares only once. The method may further comprise the step of scanning the items obtained by at least one of the plurality of scanner softwares with that scanner software. The determining step may comprise the step of determining what items of the plurality of items the email message is to be decomposed into based on the items of the plurality of items that a scanner software is capable of scanning. The plurality of scanners may comprise at least one of an anti-virus scanner, an anti-spam scanner, and a bad content scanner. The plurality of items of the email message may comprise at least one of a MIME stream, MIME headers, an HTML item, a ZIP item, a text item, a document, and a list of URLs. The email messages may be incoming email messages or the email messages may be outgoing email messages.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary pseudo-code listing of a root function implementing scanner-driven decomposition.

FIG. 4 is an exemplary pseudo-code listing of a scanner function implementing scanner-driven decomposition.

FIG. 5 is an exemplary pseudo-code listing of a node function implementing scanner-driven decomposition.

FIG. 6 is an exemplary pseudo-code listing of a node function implementing scanner-driven decomposition.

FIG. 7 is an exemplary pseudo-code listing of a decomposer function implementing scanner-driven decomposition.

FIG. 8 is an exemplary pseudo-code listing of a decomposer function implementing scanner-driven decomposition.

FIG. 9 is an exemplary listing of scanners that may be used in implementing scanner-driven decomposition.

FIG. 10 is an exemplary listing of decomposers that may be used in implementing scanner-driven decomposition.

DETAILED DESCRIPTION OF THE INVENTION

A method, system, and computer program product for scanning emails reduces the server resources needed, which improves server throughput and reduces costs. This provides an alternative "scanner-driven" model, in which each scanner requests the amount of decomposition it requires to make a decision on the binary stream and no more, thus optimizing the amount of decomposition carried out for any one scan. Such a model is particularly relevant to AntiSpam scanning, where a decision can often be made before all possible levels of decomposition have been carried out. In more general terms it is applicable when users have turned off certain scanners, such as "content".

Figure 1:
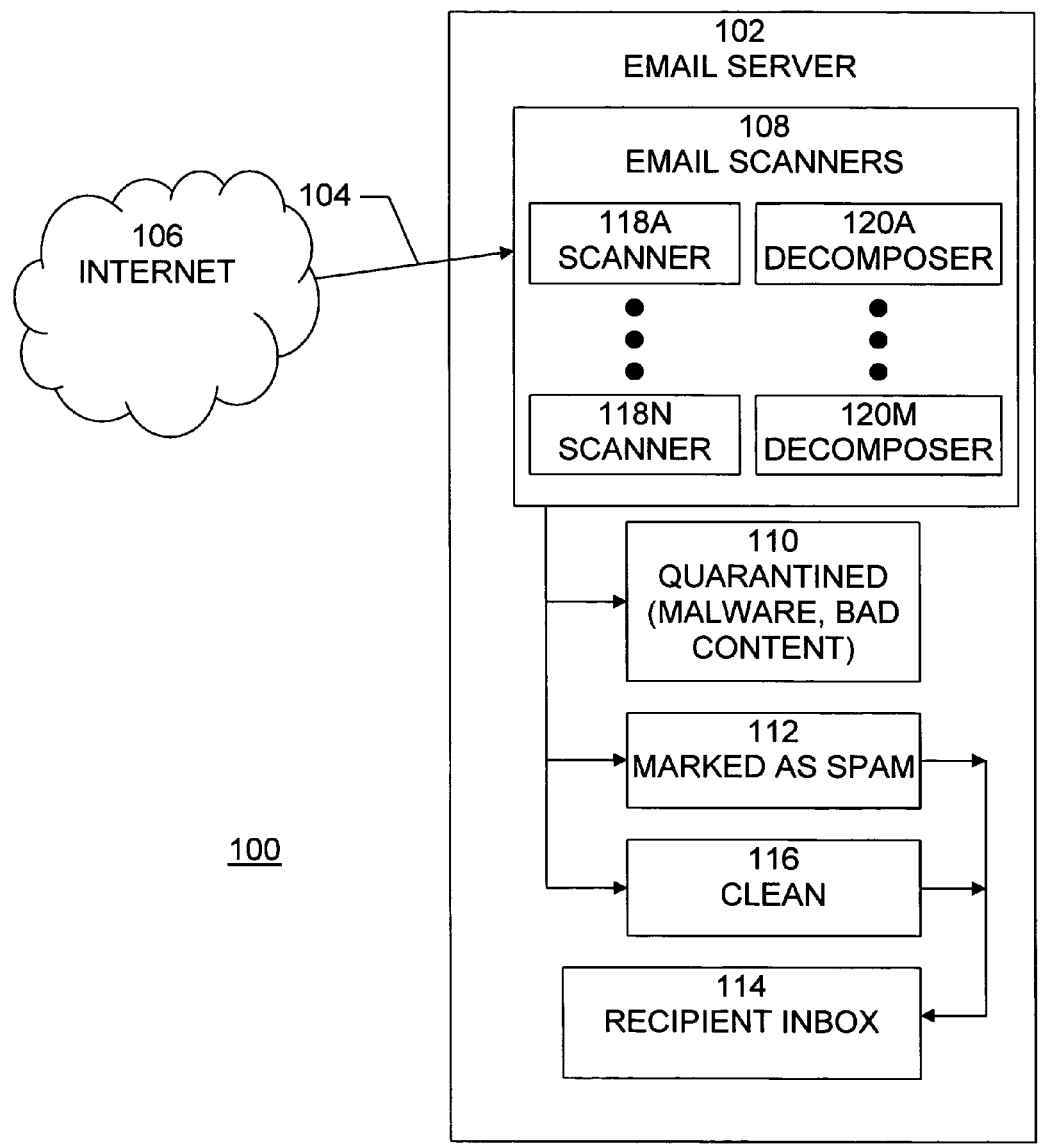
FIG. 1 is an exemplary block diagram of a system in which the present invention may be implemented.

A block diagram of a system 100 in which the present invention may be implemented is shown in FIG. 1. Email server 102 receives email messages 104 via the Internet 106, or other unsecure network. The email messages are processed by email scanner 108. Email scanner 108 automates the highlighting, removal or filtering of e-mail spam, malware, and/or bad content by scanning through incoming and outgoing e-mails in search of traits typical of such undesirable items. Such scanning may include searching for patterns in the headers or bodies of messages. Each incoming email message is scanned to determine whether it is a dangerous spam email message, including malware or bad content, which is to be quarantined 110, a spam email message that is to be marked as SPAM 112 and delivered to the recipients inbox 114, or a clean email message 116 that is to be delivered as is to the recipient's inbox 114. Email scanners 108 include a plurality of scanners 118A-N, each of which is capable of scanning one or more different item types and scanning for one or more types of undesirable content. A scanner is a component that can run against an item to determine whether or not it has undesirable content, such as AntiVirus, AntiSpam, bad conent, and other scanners. An item is a stream of data and an item type is a category of item, such as a MICROSOFT WORD® document or a MICROSOFT WINDOWS® executable. A scannable item type is an item type that can be scanned by one or more scanners. Note that this can include compound items. An example is a MIME stream, which can be scanned by an AntiVirus scanner, an AntiSpam scanner, a bad conent scanner, and other scanners. An item of type unknown is an item of a type that cannot be established until the item has been decomposed. A compound item is an item that can be decomposed to one or more other items of type unknown. Example compound item types include zip files and MIME streams (emails).

Figure 2:
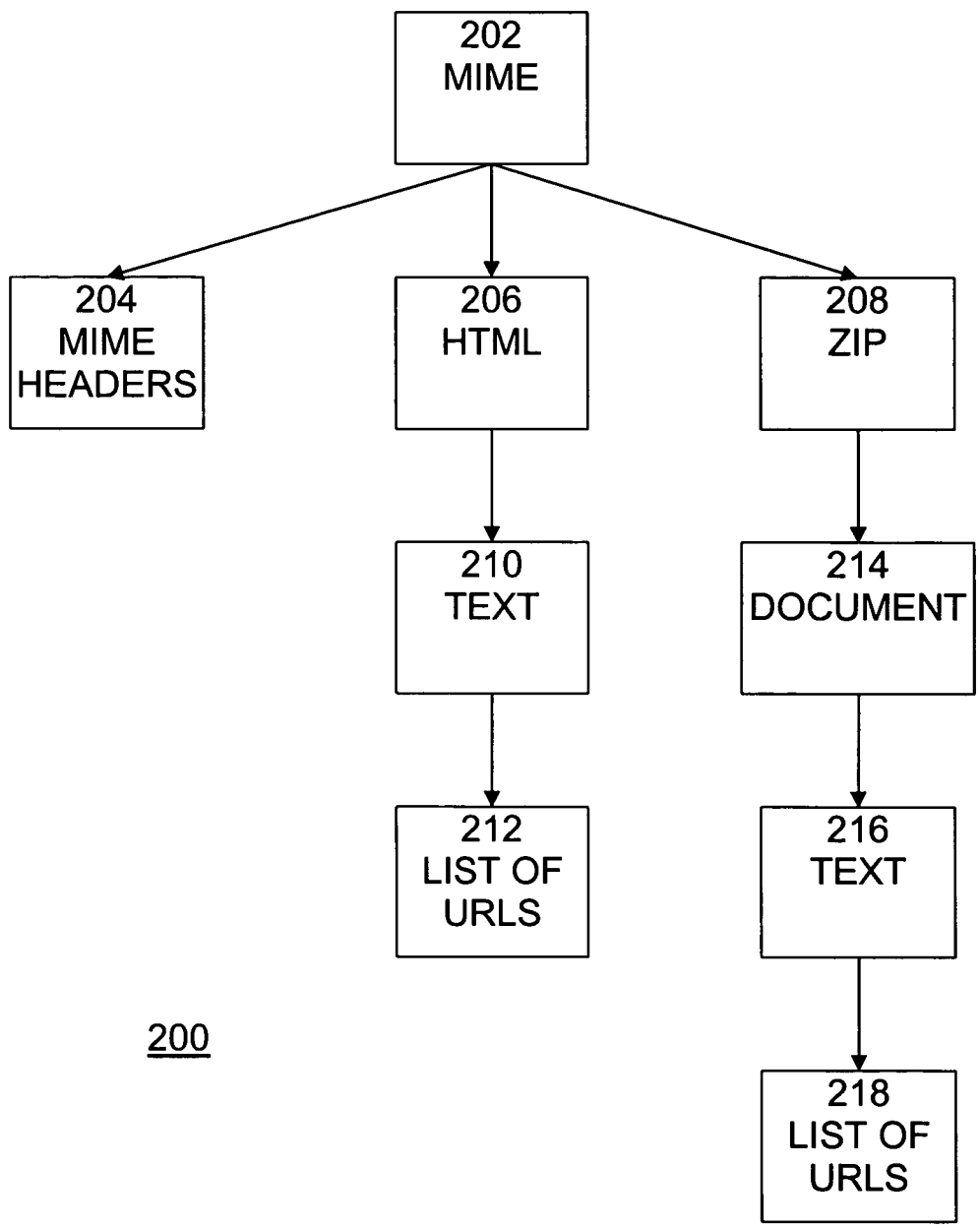
FIG. 2 is an exemplary block diagram of decomposition of a compound item, which is a MIME stream.

Email scanners 108 also include a plurality of decomposers 102A-M. A decomposer is a component that can decompose items of a particular type to one ore more constituent items. A decomposition tree is a tree representing the current decomposition state of a compound item, with each node in the tree representing one item. An example of a decomposition tree 200 is shown in FIG. 2. The example of FIG. 2 shows the decomposition of a compound item 202, which is a MIME stream. Multipurpose Internet Mail Extensions (MIME) is an Internet Standard that extends the format of e-mail to support text in character sets other than US-ASCII, non-text attachments, multi-part message bodies, and header information in non-ASCII character sets. MIME is also a fundamental component of communication protocols such as HTTP, which requires that data be transmitted in the context of e-mail-like messages, even though the data may not actually be e-mail.

MIME item 202 can be decomposed into a plurality of constituent items, such as MIME headers 204, HyperText Markup Language (HTML) item 206, and ZIP item 208. Thus, decomposition tree 200 includes a number of branches. A decomposition sub-tree is a decomposition tree that is a branch of another decomposition tree. MIME headers 204 include information about MIME item 202 and about the items included in MIME item 202, such as HTML item 206 and ZIP item 208. Typically, a decomposer capable of decomposing MIME items will use MIME headers 204 to decompose MIME item 202 into its constituent items. HTML item 206 and ZIP item 208 are themselves compound items that may be decomposed into further constituent items. Thus, HTML item 206 and ZIP item 208 from decomposition sub-trees in FIG. 2.

HTML item 206 includes information in the HTML language. HTML is a predominant markup language for the creation of web pages. It provides a means to describe the structure of text-based information in a document. HTML item 206 is a compound item that includes a plurality of items, such as text item 210. HTML denotes certain text as headings, paragraphs, lists, and so on—and to supplement that text with interactive forms, embedded images, and other objects. Likewise, text item 210 includes a plurality of items, such as a list of Uniform Resource Locators (URLs) 212. Each constituent item may be obtained by decomposing the inclusive item with one or more decomposers.

ZIP item 208 includes information in the ZIP file format. The ZIP file format is a popular data compression and archival format. A ZIP file contains one or more files or documents, such as document 214, which have been compressed or stored. Likewise, each document, such as document 214, includes constituent items, such as text item 216. Finally, text item 216 includes a plurality of items, such as a list of URLs 216. Each constituent item may be obtained by decomposing the inclusive item with one or more decomposers.

Each item in decomposition tree 200 may be scanned by a scanner that is the capable of scanning one or more different item types and scanning for one or more types of undesirable content. Compound items may, in some cases, be fully scanned by a scanner. However, typically, a compound item must be decomposed into its constituent items, and then each constituent item is scanned by the appropriate scanner. A scanner reports that it is satisfied by a decomposition tree when it has scanned the contents of that tree to its own satisfaction at the current state of decomposition. If all sub-trees of a decomposition tree satisfy a scanner than the decomposition tree satisfies that scanner.

Exemplary psuedo-code samples of an exemplary method of scanner-driven decomposition are shown in FIGS. 3-8. This exemplary method is scanner-driven. This means the decomposition tree is only expanded as far as is necessary to satisfy all sub-trees for all scanners and no further. Thus unnecessary decompositions are avoided. One decomposition tree is used by all scanners so no decomposition step is carried out more than once.

In the exemplary function 300, shown in FIG. 3, each scanner is able to drive the decomposition to whatever level it requires to be satisfied by the sub-tree. The method is driven by a recursive function 300 that takes two parameters: a node in the decomposition tree and a list of scanners to scan with. In step 302, each scanner in the list is called and returns whether or not it is satisfied. If a scanner is satisfied, it is removed from the list. For the first call (on the root node), the scanner list contains all of the available scanners. In step 304, if there are any remaining scanners in the list, the current decomposition node is decomposed. In step 306, the child nodes resulting from the decomposition performed in step 304 are scanned with the scanners remaining in the list. The root call completes when all scanners are satisfied by the whole decomposition tree.

Each scanner implements a version of the function shown in FIG. 4. In the function 400, shown in FIG. 4, each scanner is able to drive the decomposition to whatever level it requires to be satisfied by the sub-tree. In step 402, function 400 determines whether the decomposition node being processed is a type that is supported by the scanner. In step 404, if the node is supported, the node is scanned, including recursively further decomposing the node.

Each node in the decomposition tree supports the functions shown in FIGS. 5 and 6. The function 500, shown in FIG. 5, attempts to decompose one more level in the sub-tree to the specified type by, in step 502, invoking each decomposer in turn. The function 600 shown in FIG. 6 attempts to establish the type of the node by, in step 602, invoking each decomposer in turn.

Each decomposer supports the functions shown in FIGS. 7 and 8. In the function 700, shown in FIG. 7, the decomposer, in step 702, establishes whether the given item is of a type it recognizes. In the function 800, shown in FIG. 8, the decomposer carries out its decomposition, first, in step 802, determining whether it supports either node, then, in step 804, creating additional nodes in the decomposition tree as required.

Examples of scanners that may be used, and their characteristics, are shown in FIG. 9. For example, scanner 902 may be an anti-virus scanner, an anti-spam scanner, a bad content scanner, etc. Each scanner has associated item types that may be satisfied by a scan 904, such as documents, HTML items, MIME items, text items, etc. Likewise, each scanner has associated item types that it can scan 906, such as MIME items, documents, HTML items, MIME headers, text items, lists of URLs, etc.

It is to be noted that the scanners shown in FIG. 9 are merely examples. The present invention contemplates use with any type of scanner, and scanners capable of scanning any type of item.

Examples of decomposers that may be used, and their characteristics, are shown in FIG. 10. For example, decomposer 1002 may decompose MIME items, ZIP items, HTML items, text items, documents, etc. Each decomposer has associated item types that may be decomposed from 1004, such as MIME items, ZIP items, HTML items, text items, documents, etc. Likewise, each scanner has decomposer item types that it can decompose items to 1004, such as MIME headers, HTML items, unknown items, text items, lists of URLs, etc.

It is to be noted that the decomposers shown in FIG. 10 are merely examples. The present invention contemplates use with any type of decomposer, and decomposer capable of decomposing any type of item.

An example of processing of a data stream using scanner-driven decomposition is shown in FIGS. 11-16. This example assumes that the data stream contains no viruses, spam or bad content. The example is best viewed in conjunction with the decomposition tree 200, shown in FIG. 2. At the first stage of the decomposition example, the decomposition tree includes only MIME item 202, as shown in FIG. 11a. Turning to FIG. 11b, it is seen that the unsatisfied scanners at the beginning of this stage 1102 include the anti-virus scanner, the anti-spam scanner and the bad content scanner. The actions taken by each scanner at this stage 1104 are that the anti-virus scanner recognizes the item as MIME and scans it, the anti-spam scanner recognizes the item as MIME and begins to scan by performing a top level decomposition, and the bad content scanner is not run as it cannot handle MIME items. The result of this stage 1106 is that all scanners are unsatisfied.

Figures 12A, 12B:
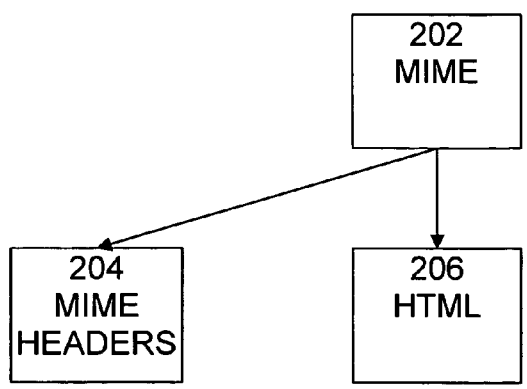
FIG. 12a is an exemplary block diagram of a second stage of decomposition of a compound item, which is a MIME stream.
FIG. 12b is a diagram of a second stage of an example of scanner-driven decomposition.

At the second stage of the decomposition example, the decomposition tree includes MIME item 202, MIME headers 204 and HTML item 206, as shown in FIG. 12a. Turning to FIG. 12b, it is seen that the unsatisfied scanners at the beginning of this stage 1202 include the anti-virus scanner, the anti-spam scanner and the bad content scanner. The actions taken by each scanner at this stage 1204 are the anti-spam scanner decomposes the MIME headers node 202 and scans it. As is cannot determine whether the mail is spam on this basis alone it decomposes to the HTML node 206 and scans that. The bad content scanner is not run as it cannot handle MIME items and the anti-virus scanner is also not run. The result of this stage 1206 is that all scanners are unsatisfied.

Figures 13A, 13B:
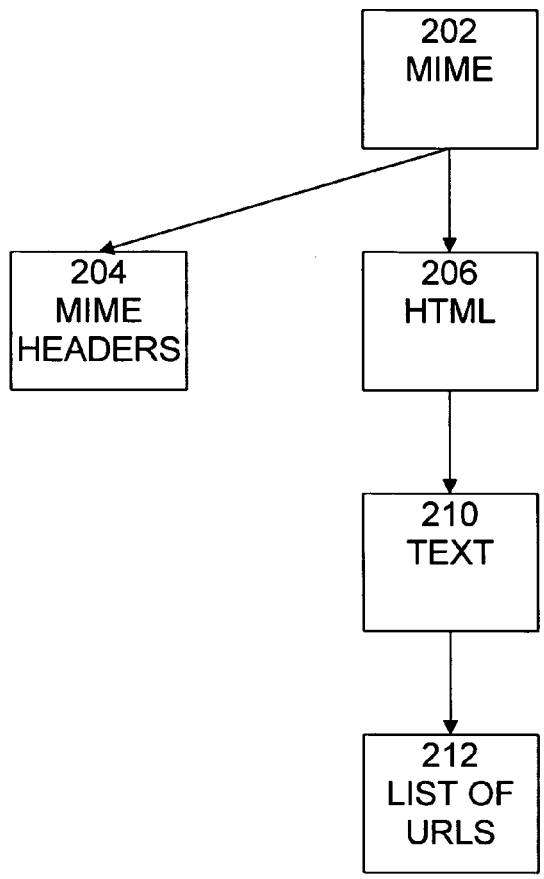
FIG. 13a is an exemplary block diagram of a third stage of decomposition of a compound item, which is a MIME stream.
FIG. 13b is a diagram of a third stage of an example of scanner-driven decomposition.

At the third stage of the decomposition example, the decomposition tree includes MIME item 202, MIME headers 204, HTML item 206, text item 210 and list of URLs 212, as shown in FIG. 13a. Turning to FIG. 13b, it is seen that the unsatisfied scanners at the beginning of this stage 1302 include the anti-virus scanner, the anti-spam scanner and the bad content scanner. The actions taken by each scanner at this stage 1304 are the anti-spam scanner is still not able to complete and so decomposes and scans body text and URLs. It has now established that the MIME message is not spam and so is satisfied by the whole decomposition tree. The bad content scanner and the anti-virus scanner are not run. The result of this stage 1306 is that the anti-spam scanner is satisfied and the bad content scanner and the anti-virus scanner are unsatisfied.

Figures 14A, 14B:
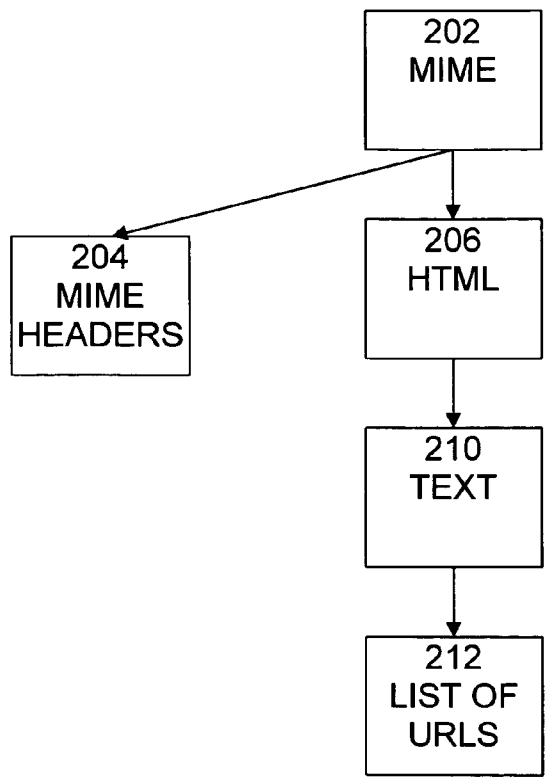
FIG. 14a is an exemplary block diagram of a fourth stage of decomposition of a compound item, which is a MIME stream.
FIG. 14b is a diagram of a fourth stage of an example of scanner-driven decomposition.

At the fourth stage of the decomposition example, the decomposition tree includes MIME item 202, MIME headers 204, HTML item 206, text item 210 and list of URLs 212, as shown in FIG. 14*a*. Turning to FIG. 14*b*, it is seen that the unsatisfied scanners at the beginning of this stage 1402 include the anti-virus scanner and the bad content scanner. The actions taken by each scanner at this stage 1404 are the anti-virus scanner scans the MIME headers item and, as it is not interested in that type, reports that it is not satisfied by it. The bad content scanner scans the MIME headers item and reports that it is satisfied by it. The anti-virus scanner scans the HTML and reports that it is satisfied by it. The bad content scanner reports that is not satisfied by HTML. It is then presented with the Text node, which it scans, and reports that it is satisfied by. Note that this entire step does not involve any new decompositions. The result of this stage 1406 is that the bad content scanner is satisfied and the anti-virus scanner is not satisfied.

Figures 15A, 15B:
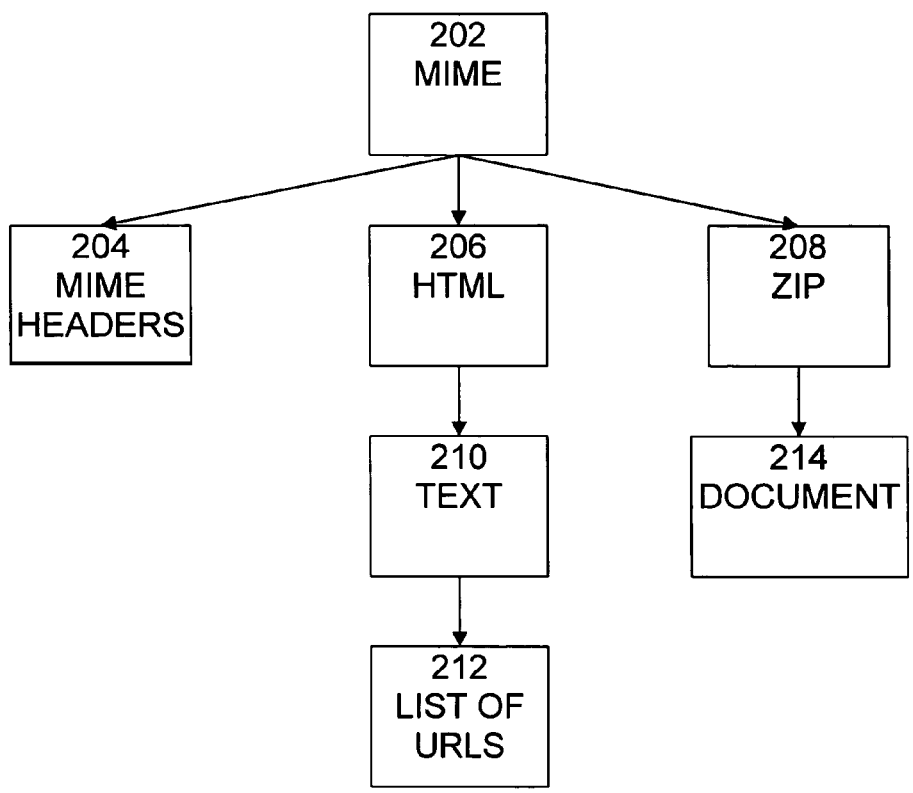
FIG. 15a is an exemplary block diagram of a fifth stage of decomposition of a compound item, which is a MIME stream.
FIG. 15b is a diagram of a fifth stage of an example of scanner-driven decomposition.

At the fifth stage of the decomposition example, the decomposition tree includes MIME item 202, MIME headers 204, HTML item 206, text item 210, list of URLs 212, ZIP item 208 and document 214, as shown in FIG. 15*a*. Turning to FIG. 15*b*, it is seen that the unsatisfied scanners at the beginning of this stage 1502 include the anti-virus scanner and the bad content scanner (which is not satisfied now that additional decomposition has occurred). The actions taken by each scanner at this stage 1504 are the anti-virus scanner decomposes the ZIP item 208 and scans the document 214 and is satisfied by it. The bad content scanner does not handle these types of items and so is not satisfied. The result of this stage 1506 is that the bad content scanner is not satisfied and the anti-virus scanner is satisfied.

Figures 16A, 16B:
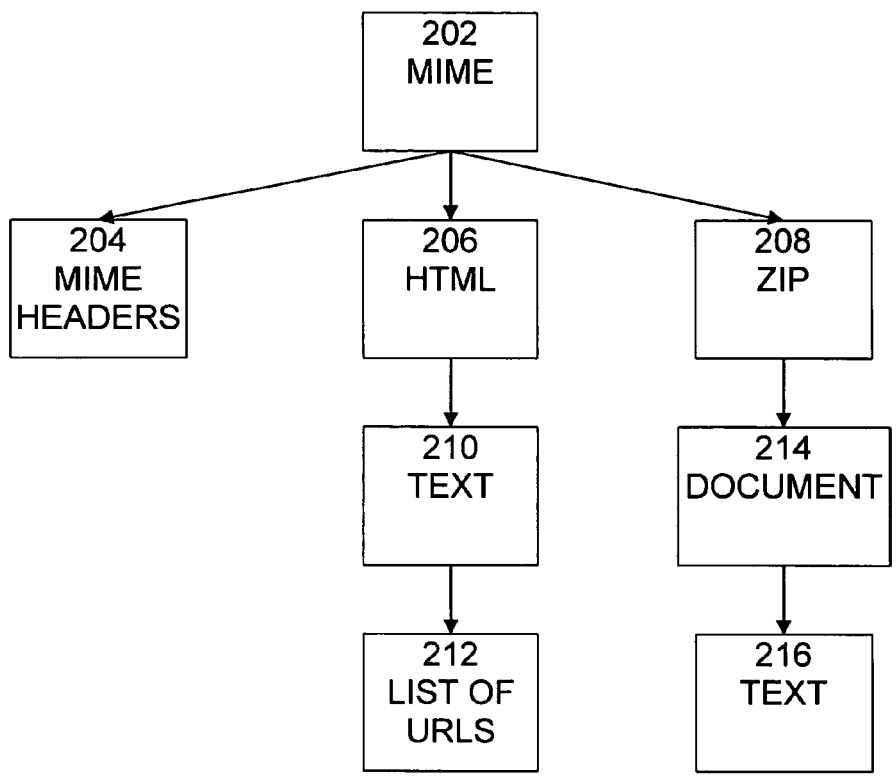
FIG. 16a is an exemplary block diagram of a sixth stage of decomposition of a compound item, which is a MIME stream.
FIG. 16b is a diagram of a sixth stage of an example of scanner-driven decomposition.

At the sixth stage of the decomposition example, the decomposition tree includes MIME item 202, MIME headers 204, HTML item 206, text item 210, list of URLs 212, ZIP item 208, document 214, and text item 216, as shown in FIG. 16*a*. Turning to FIG. 16*b*, it is seen that the unsatisfied scanners at the beginning of this stage 1602 include only the bad content scanner. The actions taken by each scanner at this stage 1404 are that the bad content scanner decomposes document 214 to text item 216, scans it and is satisfied. All scanners are now satisfied for all subtrees of MIME and therefore the scan is complete. The result of this stage 1606 is that all scanners are satisfied.

Figures 17A, 17B:
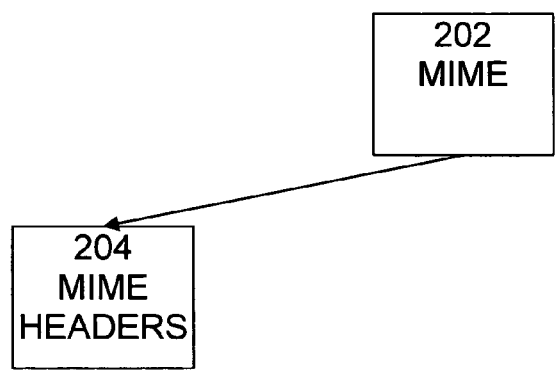
FIG. 17a is an exemplary block diagram of a second stage of decomposition of a compound item, which is a MIME stream.
FIG. 17b is a diagram of a second stage of an example of scanner-driven decomposition.

The example shown in FIGS. 11-16 shows how the method can scan a decomposition tree using three scanners without performing any decomposition steps more than once. However, virtually the entire decomposition tree is expanded (only the final URL list step is avoided). In the example shown in FIGS. 17-20, it is assumed that the MIME message is a spam than can be detected as such purely on the basis of its headers. Stage 1 is as shown in FIG. 11. From there the scan proceeds with stage two, shown in FIGS. 17*a* and 17*b*. At the second stage of this example, the decomposition tree includes MIME item 202 and MIME headers 204, as shown in FIG. 17*a*. All scanners are initially unsatisfied 1702, as shown in FIG. 17*b*. The actions taken 1704 are that the anti-spam scanner decomposes the MIME Headers and scans them. On this basis it is able to determining that the mail is spam and completes its scan without any further decomposition. The anti-virus scanner and the bad content scanner are not run. The result 1706 is that the anti-spam scanner is satisfied by the MIME items, and the anti-virus and bad content scanners are not satisfied.

Figures 18A, 18B:
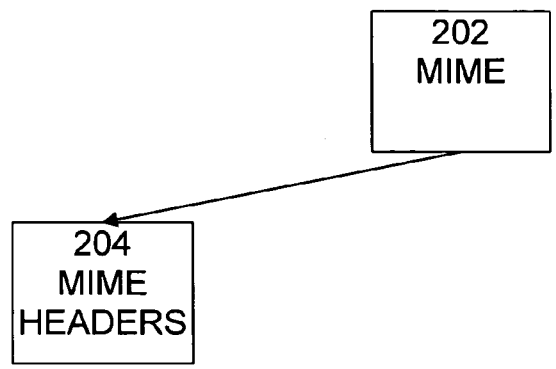
FIG. 18a is an exemplary block diagram of a third stage of decomposition of a compound item, which is a MIME stream.
FIG. 18b is a diagram of a third stage of an example of scanner-driven decomposition.

At the third stage of this example, the decomposition tree includes MIME item 202 and MIME headers 204, as shown in FIG. 18*a*. Turning to FIG. 18*b*, it is seen that the unsatisfied scanners 1802 include the anti-virus scanner and the bad content scanner. The actions taken 1804 are that the anti-virus scanner scans the MIME headers item and as it is not interested in that type reports that it is satisfied by it. The bad content scanner scans the MIME headers item and reports that it is satisfied by it. The result 1806 is that the anti-virus scanner is satisfied by the MIME items, and the bad content scanner is not satisfied.

Figures 19A, 19B:
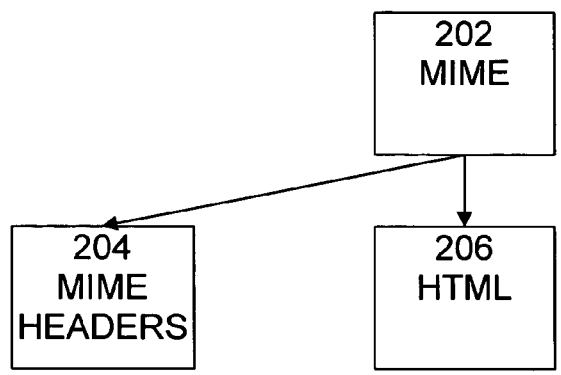
FIG. 19a is an exemplary block diagram of a fourth stage of decomposition of a compound item, which is a MIME stream.
FIG. 19b is a diagram of a fourth stage of an example of scanner-driven decomposition.

At the fourth stage of this example, the decomposition tree includes MIME item 202, MIME headers 204, and HTML item 206, as shown in FIG. 19*a*. Turning to FIG. 19*b*, it is seen that the unsatisfied scanners 1902 include the anti-virus scanner (which has not examined the HTML item 206) and the bad content scanner. The actions taken 1904 are that as the MIME items have not satisfied all scanners the HTML node 206 is decomposed. The anti-virus scanner scans HTML item 206 and is satisfied by it. The bad content scanner is not satisfied however. The result 1906 is that the anti-virus scanner is satisfied by HTML item 206, and the bad content scanner is not satisfied.

Figures 20A, 20B:
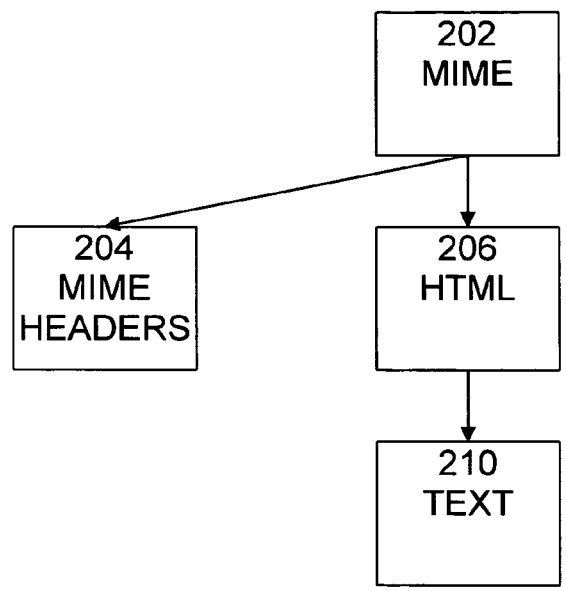
FIG. 20a is an exemplary block diagram of a fifth stage of decomposition of a compound item, which is a MIME stream.
FIG. 20b is a diagram of a fifth stage of an example of scanner-driven decomposition.

At the fifth stage of this example, the decomposition tree includes MIME item 202, MIME headers 204, HTML item 206, and text item 210, as shown in FIG. 20*a*. Turning to FIG. 20*b*, it is seen that the unsatisfied scanners 2002 include the bad content scanner. The actions taken 2004 are that the bad content scanner scans text item 210 and is satisfied. The result 2006 is that the bad content scanner is satisfied by text item 210.

Figure 21:
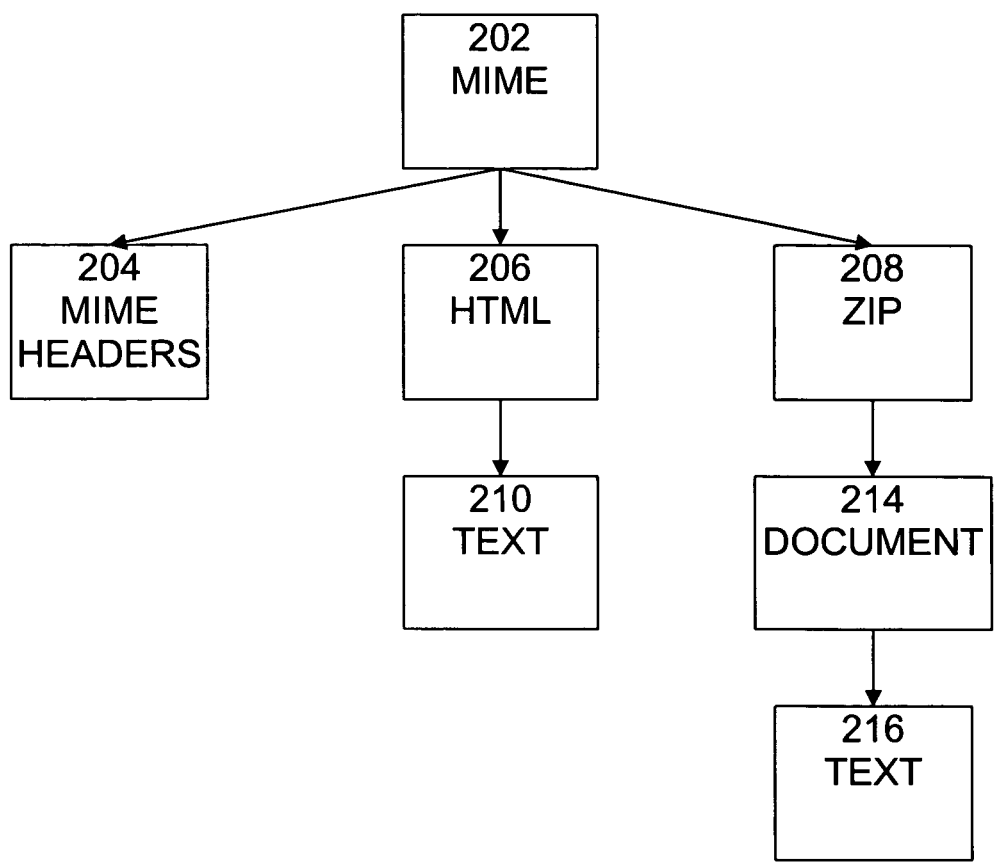
FIG. 21 is an exemplary block diagram of completed decomposition of a compound item, which is a MIME stream.
Figure 22:
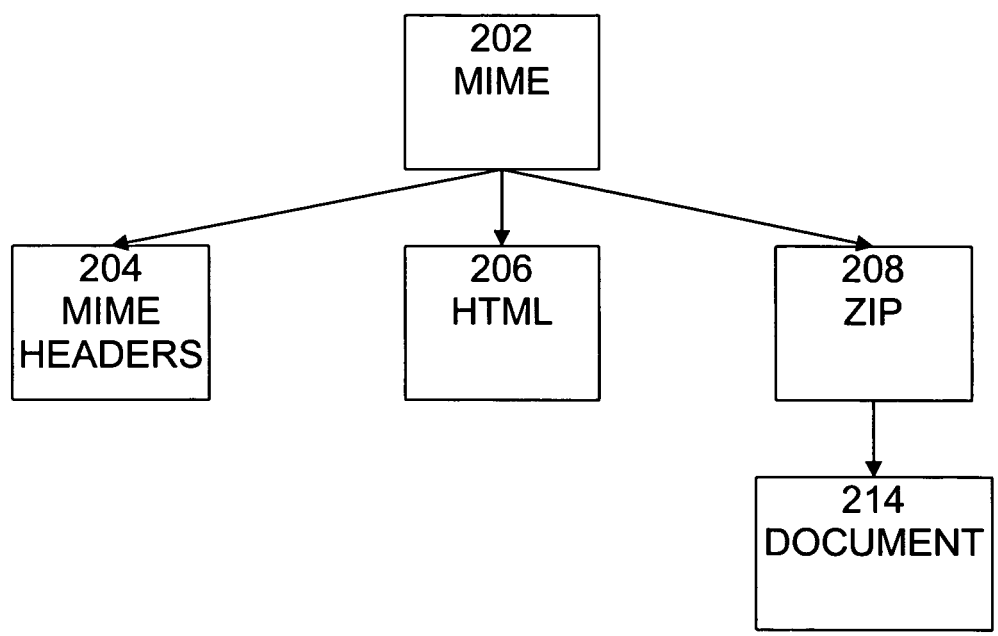
FIG. 22 is an exemplary block diagram of completed decomposition of a compound item, which is a MIME stream.

The sixth stage of this example is similar to that shown in FIG. 16, although the method recursively decomposed the ZIP item 208 because at a previous stage, at which the recursion occurs, scanners were unsatisfied. At completion, the decomposition tree includes MIME item 202, MIME headers 204, HTML item 206, text item 210, ZIP item 208, document 214, and text item 218, as shown in FIG. 21. Thus, it is seen that at completion one more decomposition step has been avoided.

In another example, the method can scan a decomposition tree using two scanners (not using the bad content scanner). In this example, there is no need to decompose the HTML node or the Document node and the final decomposition tree includes MIME item 202, MIME headers 204, HTML item 206, ZIP item 208, and document 214. Two more decomposition steps have been avoided.

The described method is one possible way of implementing a scanner-driven model that is both simple and modular, allowing the addition of zero or more decomposers and scanners as are required by particular products in particular situations. A number of implementations of the method are possible. The present invention contemplates and and all such implementations.

Figure 23:
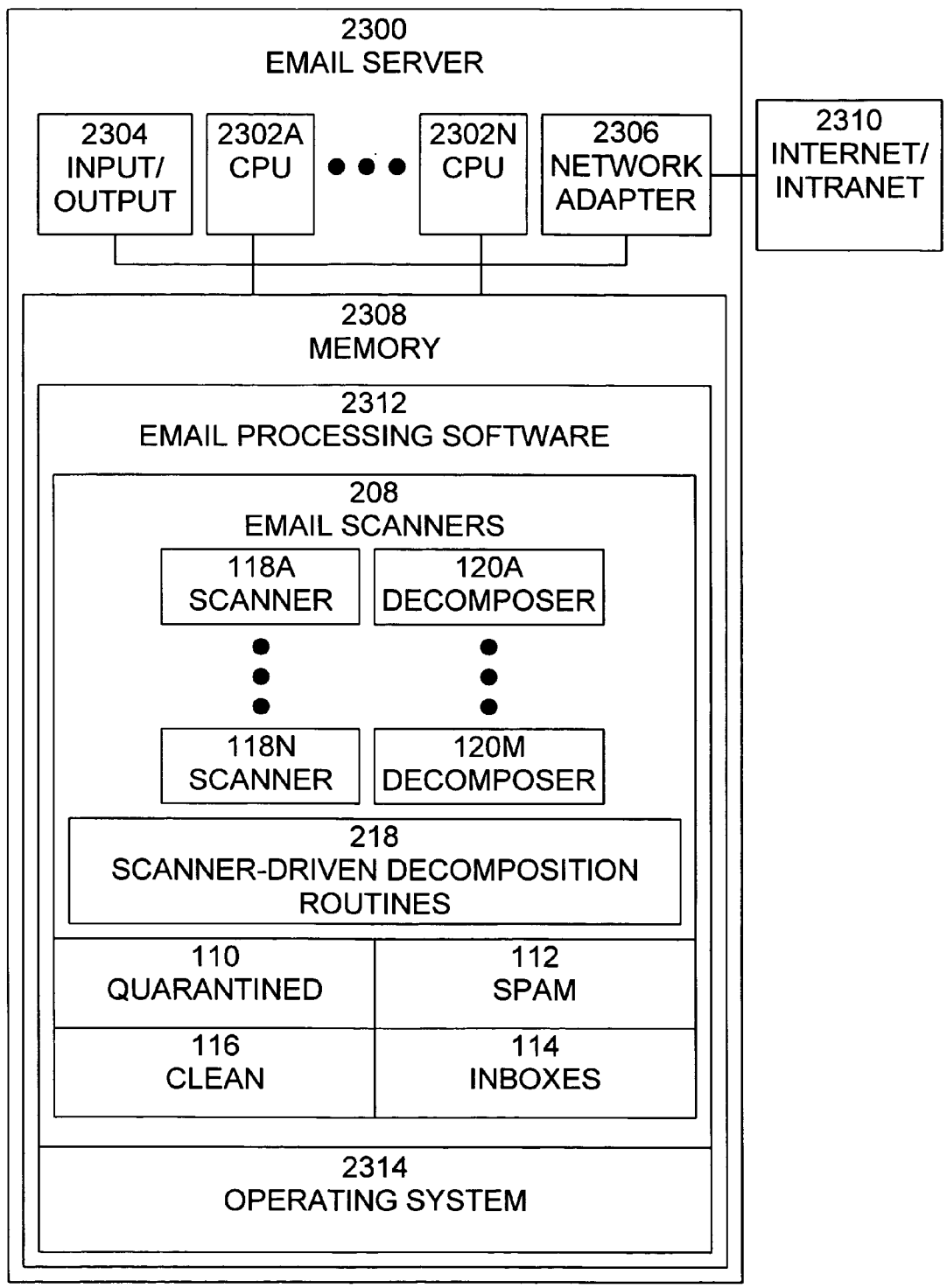
FIG. 23 is an exemplary block diagram of an email server, in which the present invention may be implemented.

An exemplary block diagram of an email server 2300, in which the present invention may be implemented, is shown in FIG. 23. Email server 2300 is typically a programmed general-purpose computer system, such as a personal computer, workstation, server system, and minicomputer or mainframe computer. Email server 2300 includes one or more processors (CPUs) 2302A-2302N, input/output circuitry 2304, network adapter 2306, and memory 2308. CPUs 2302A-2302N execute program instructions in order to carry out the functions of the present invention. Typically, CPUs 2302A-2302N are one or more microprocessors, such as an INTEL PEN- TIUM® processor. FIG. 23 illustrates an embodiment in which email server 2300 is implemented as a single multi-processor computer system, in which multiple processors 2302A-2302N share system resources, such as memory 2308, input/output circuitry 2304, and network adapter 2306. However, the present invention also contemplates embodiments in which email server 2300 is implemented as a plurality of networked computer systems, which may be single-processor computer systems, multi-processor computer systems, or a mix thereof.

Input/output circuitry 2304 provides the capability to input data to, or output data from, email server 2300. For example, input/output circuitry may include input devices, such as keyboards, mice, touchpads, trackballs, scanners, etc., output devices, such as video adapters, monitors, printers, etc., and input/output devices, such as, modems, etc. Network adapter 2306 interfaces email server 2300 with Internet/intranet 2310. Internet/intranet 2310 may include one or more standard local area network (LAN) or wide area network (WAN), such as Ethernet, Token Ring, the Internet, or a private or proprietary LAN/WAN.

Memory 2308 stores program instructions that are executed by, and data that are used and processed by, CPU 2302 to perform the functions of email server 2300. Memory 2308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 23, memory 2308 includes email processing software 2312 and operating system 2314. Email processing software 2312 includes email scanners 208, which include scanners 118A-N, decomposers 120A-M, and scanner-driven decomposition routines 212, quarantined emails 210, spam emails 212, clean emails 214, recipient inboxes 216, and, as well as additional functionality that is not shown. Email scanners 208 automate the highlighting, removal or filtering of e-mail spam by scanning through incoming and outgoing e-mails in search of traits typical of spam. Such scanning may include searching for patterns in the headers or bodies of messages. Each incoming email message is scanned to determine whether it is a spam email message that is to be marked as SPAM, a dangerous spam email message that is to be quarantined, or a clean email message that is to be delivered as is to the recipient's inbox. In addition, email scanner 208 scans the email address of the sender of the email, and may also scan the first and last name of the sender of the email. Scanners 118A-N and decomposers 120A-M decompose the email messages into their constituent items and scan the items to determine their status. Each incoming email message is scanned to determine whether it is a dangerous spam email message that is to be quarantined 110, a spam email message that is to be marked as SPAM 112 and delivered to the recipients inbox 114, or a clean email message 116 that is to be delivered as is to the recipient's inbox 114. Scanner-driven decomposition routines control the operation of scanners 118A-N and decomposers 120A-M to scan the email messages using the scanner-driven method described above. Operating system 2114 provides overall system functionality.

As shown in FIG. 23, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. For example, the present invention may be advantageously employed in scanning outgoing email messages, as well as incoming email messages. Accordingly, it is to be understood that the invention is not to be limited by the specific illustrated embodiments, but only by the scope of the appended claims.

What is claimed is:
1. A method, comprising:
receiving an email message comprising a plurality of items;
scanning the email message with a plurality of scanner software, which are configured to perform activities that are based on a same decomposition tree used for scanning the e-mail message;
expanding the decomposition tree to satisfy sub-trees for scanners in the plurality of scanner software; and
employing a recursive function that identifies a node in the decomposition tree and a list of scanners with which to scan, wherein:

on the root node of the decomposition tree, the list of scanners comprises the plurality of scanners;

at each iteration of the recursive function, each scanner in the list of scanners is called to perform a scanning operation on the e-mail message and return whether it is satisfied such that it is removed from the list of scanners;

if there are any remaining scanners in the list, the node in the decomposition tree is decomposed; and the recursive function is complete when the plurality of scanners have been removed from the list of scanners.

2. The method of claim 1, further comprising:
scanning the items obtained by each of the at least one of the plurality of scanner software with that scanner software.

3. The method of claim 2, wherein the determining comprises:
determining what items of the plurality of items the email message is to be decomposed into based on items of the plurality of items that the at least one of the plurality of scanner software is capable of scanning.

4. The method of claim 1, further comprising:
scanning the items obtained by the at least one of the plurality of scanner software with that scanner software.

5. The method of claim 4, wherein the determining comprises:
determining what items of the plurality of items the email message is to be decomposed into based on items of the plurality of items that the at least one of the plurality of scanner software is capable of scanning.

6. The method of claim 5, wherein the plurality of scanner software comprise at least one of an anti-virus scanner, an anti-spam scanner, and a bad content scanner.

7. The method of claim 6, wherein the plurality of items of the email message comprises at least one of a MIME stream, MIME headers, an HTML item, a ZIP item, a text item, a document, and a list of URLs.

8. The method of claim 1, wherein the email messages are incoming email messages.

9. The method of claim 1, wherein the email messages are outgoing email messages.

10. The method of claim 1, wherein each of the items obtained from the decomposing of the email message is included as a separate node of a decomposition tree.

11. The method of claim 10, wherein the decomposing of the email message to obtain the items includes a function determining whether a current node of the decomposition tree being processed is a type that is supported by the at least one of the plurality of scanner software, where if the type of the node is supported, the node is scanned, including recursively decomposing the node into at least one additional node of the decomposition tree.

12. The method of claim 1, wherein the email message is decomposed using a decomposition tree.

13. The method of claim 12, wherein each item in the decomposition tree is scanned by the at least one of the plurality of scanner software that is capable of scanning the at least one type of the item.

14. A system, comprising:
a processor; and
a memory element coupled to the processor, wherein the system is configured for:
receiving an email message comprising a plurality of items;
scanning the email message with a plurality of scanner software, which are configured to perform activities that are based on a same decomposition tree used for scanning the e-mail message;
expanding the decomposition tree to satisfy sub-trees for scanners in the plurality of scanner software; and
employing a recursive function that identifies a node in the decomposition tree and a list of scanners with which to scan, wherein:
on the root node of the decomposition tree, the list of scanners comprises the plurality of scanners;
at each iteration of the recursive function, each scanner in the list of scanners is called to perform a scanning operation on the e-mail message and return whether it is satisfied such that it is removed from the list of scanners;
if there are any remaining scanners in the list, the node in the decomposition tree is decomposed; and
the recursive function is complete when the plurality of scanners have been removed from the list of scanners.

15. The system of claim 14, wherein the system is operable such that the items obtained by each of the at least one of the plurality of scanner software are scanned with that scanner software.

16. The system of claim 15, wherein the determining comprises determining what items of the plurality of items the email message is to be decomposed into based on items of the plurality of items that the at least one of the plurality of scanner software is capable of scanning.

17. The system of claim 14, wherein the system is operable such that the items obtained by the at least one of the plurality of scanner software are scanned with that scanner software.

18. The system of claim 17, wherein the determining comprises the processor for determining what items of the plurality of items the email message is to be decomposed into based on items of the plurality of items that the at least one of the plurality of scanner software is capable of scanning.

19. The system of claim 18, wherein the plurality of scanner software comprises at least one of an anti-virus scanner, an anti-spam scanner, and a bad content scanner.

20. The system of claim 19, wherein the plurality of items of the email message comprises at least one of a MIME stream, MIME headers, an HTML item, a ZIP item, a text item, a document, and a list of URLs.

21. The system of claim 14, wherein the email messages are incoming email messages.

22. The system of claim 14, wherein the email messages are outgoing email messages.

23. A computer program product embodied on a tangible non-transitory computer readable medium for performing operations, comprising:
receiving an email message comprising a plurality of items;
scanning the email message with a plurality of scanner software, which are configured to perform activities that are based on a same decomposition tree used for scanning the e-mail message;
expanding the decomposition tree to satisfy sub-trees for scanners in the plurality of scanner software; and
employing a recursive function that identifies a node in the decomposition tree and a list of scanners with which to scan, wherein:
on the root node of the decomposition tree, the list of scanners comprises the plurality of scanners;
at each iteration of the recursive function, each scanner in the list of scanners is called to perform a scanning operation on the e-mail message and return whether it is satisfied such that it is removed from the list of scanners;

if there are any remaining scanners in the list, the node in the decomposition tree is decomposed; and the recursive function is complete when the plurality of scanners have been removed from the list of scanners.

24. The computer program product of claim 23, further comprising computer code for scanning the items obtained by each of the at least one of the plurality of scanner software with that scanner software.

25. The computer program product of claim 24, wherein the determining comprises determining what items of the plurality of items the email message is to be decomposed into based on items of the plurality of items that the at least one of the plurality of scanner software is capable of scanning.

26. The computer program product of claim 23, further comprising computer code for scanning the items obtained by the at least one of the plurality of scanner software with that scanner software.

27. The computer program product of claim 26, wherein the determining comprises:

determining what items of the plurality of items the email message is to be decomposed into based on items of the plurality of items that the at least one of the plurality of scanner software is capable of scanning.

28. The computer program product of claim 27, wherein the plurality of scanner software comprises at least one of an anti-virus scanner, and anti-spam scanner, and a bad content scanner.

29. The computer program product of claim 28, wherein the plurality of items of the email message comprises at least one of a MIME stream, MIME headers, an HTML item, a ZIP item, a text item, a document, and a list of URLs.

30. The computer program product of claim 23, wherein the email messages are incoming email messages.

31. The computer program product of claim 23, wherein the email messages are outgoing email messages.

* * * * *

UNITED STATES PATENT AND TRADEMARK OFFICE
CERTIFICATE OF CORRECTION

| | | |
|---|---|---|
| PATENT NO. | : 8,560,614 B2 | Page 1 of 1 |
| APPLICATION NO. | : 11/605369 | |
| DATED | : October 15, 2013 | |
| INVENTOR(S) | : Richard Morrey | |

Figures 11A, 11B:
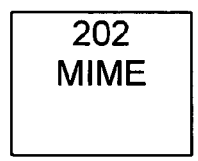
FIG. 11a is an exemplary block diagram of a first stage of decomposition of a compound item, which is a MIME stream.
FIG. 11b is a diagram of a first stage of an example of scanner-driven decomposition.

It is certified that error appears in the above-identified patent and that said Letters Patent is hereby corrected as shown below:

In the Drawings:

On sheet 8 of 20, in Figure 11B, line 2, delete "UNSATISIFED" and insert -- UNSATISFIED --, therefor.

In the Claims:

In column 14, line 9, in claim 28, delete "and anti-spam" and insert -- an anti-spam --, therefor.

Signed and Sealed this
Eleventh Day of February, 2014

Michelle K. Lee
*Deputy Director of the United States Patent and Trademark Office*